(No Model.) 2 Sheets—Sheet 1.

G. DOUGHERTY.
TILLERMAN'S SEAT FOR HOOK AND LADDER TRUCKS.

No. 549,903. Patented Nov. 19, 1895.

WITNESSES:

INVENTOR
George Dougherty.
BY
Andrew Wilson,
ATTORNEY (No Model.) 2 Sheets—Sheet 2.

G. DOUGHERTY.
TILLERMAN'S SEAT FOR HOOK AND LADDER TRUCKS.

No. 549,903. Patented Nov. 19, 1895.

WITNESSES:
Frederich Eberhardt
W. D. Neilley.

INVENTOR
George Dougherty.
BY Andrew Wilson,
ATTORNEY

UNITED STATES PATENT OFFICE.

GEORGE DOUGHERTY, OF SENECA FALLS, ASSIGNOR TO THE GLEASON & BAILEY MANUFACTURING COMPANY, OF NEW YORK, N. Y.

TILLERMAN'S SEAT FOR HOOK-AND-LADDER TRUCKS.

SPECIFICATION forming part of Letters Patent No. 549,903, dated November 19, 1895.

Application filed April 2, 1895. Serial No. 544,167. (No model.)

*To all whom it may concern:*

Be it known that I, GEORGE DOUGHERTY, of Seneca Falls, New York, have invented certain new and useful Improvements in Tillermen's Seats for Hook-and-Ladder Trucks, of which the following is a specification.

My invention relates to that class of hook-and-ladder trucks in which extension-ladders pivoted at the front of the truck and normally in a horizontal position are raised by means of a windlass and cable or other means to any desired angle, the rear truck being controlled by a tiller-shaft rotated by means of a wheel projecting above the upper ladders when they are folded and my improvements are particularly directed to the location and arrangement of the seat for the tillerman and to means whereby it may be made to fold up automatically into such a position that the ladders may be raised or lowered past it without removing the seat from its fastenings.

The details of my improvements are hereinafter more fully described.

Figure 2:
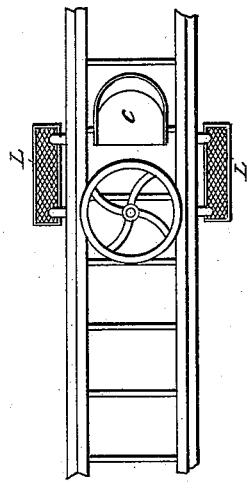
Figure 1:
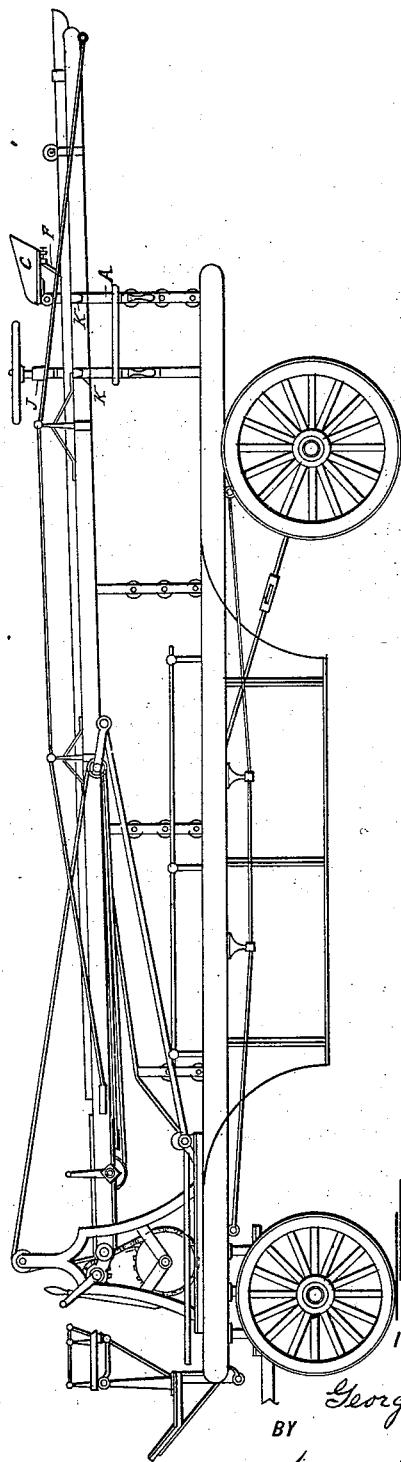
Figure 5:
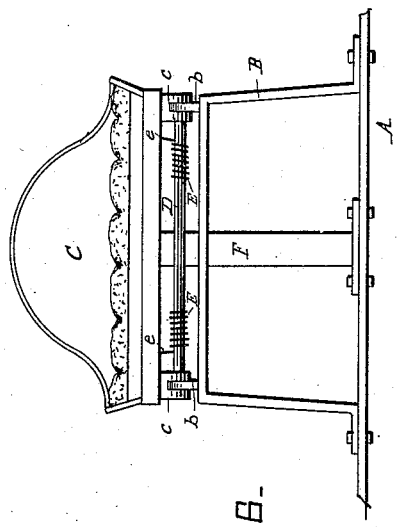
Figures 4, 6:
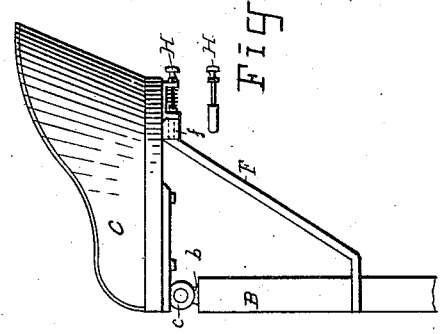
Figure 3:
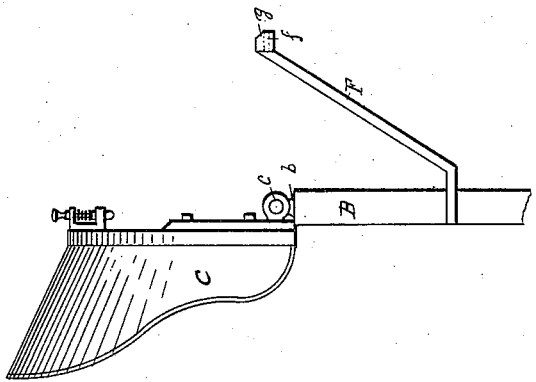

In the drawings, Figure 1 is a side elevation of a hook-and-ladder truck, showing the ladders lowered and the tillerman's seat in position for use. Fig. 2 is a top view of the ladders, platforms, tiller-crank, and seat shown in Fig. 1. Fig. 3 is a side view of the seat elevated. Fig. 4 is a side view of the seat lowered. Fig. 5 is a front view of Fig. 4, and Fig. 6 is a view of the locking pin or catch.

Similar letters of reference designate similar parts in all the figures.

A is the ladder-supporting arch, upon the top of which lie the pivoted sections of the extension-ladders. On top of this arch is secured a seat-support B, which is of a proper width to pass between the sides of the ladders. The seat C is hinged to the top of the support by means of the rod D, which passes through the ears $b\ b$ on the support and the ears $c\ c$ on the seat. Coiled springs E E are borne by the rod D, one end being fastened to the rod, while the other end $e$ is extended to rest against the bottom of the seat. The tendency of these springs is to throw the seat into a vertical position.

An arm F extends back from the support B, so as to support the back of the seat when it is down. It is provided with a socket $f$ and a beveled edge $g$, which act in conjunction with the spring-bolt H to lock the seat down. As the seat is pressed down the end of the bolt H passes down past the beveled edge $g$ of the arm F and enters the socket $f$, firmly holding the seat in place.

When the seat is down in the position shown in Fig. 1, rounds of the ladders will rest beneath the seat between the support B and the arm F, and if an attempt is made to raise the ladders the rounds will strike against the bottom of the seat; but by throwing the seat into the position shown in Fig. 3 it clears the rounds of the ladder which were beneath it, and the space occupied by it between vertical lines will be so reduced that the seat will pass through the space between two of the rounds as the ladders are raised or lowered past it.

In practice when the ladders are to be raised the tillerman, being in his seat, disconnects the tiller-wheel from its shaft at J and with one hand hangs the wheel upon one of the hooks K K. At the same time, stepping upon the platform L, with his other hand he releases the spring-catch H, whereupon the springs E throw the seat into an upright position to clear the rounds of the ladders. It will be seen that these operations can be performed in a very few seconds and all obstructions by the tiller-wheel or seat to the raising of the ladders removed. When the ladders are lowered, the seat can be pushed down and the tiller-crank replaced with equal rapidity.

It is a great advantage to have the seat attached to a permanent support, from which it is not necessary to disconnect it. It is always in place for use and always in the center line of the truck, where it is least liable to come in contact with passsing objects, and which is its natural and proper position. It does not interfere with or obstruct any part of the truck, as it must do if it is removed beyond the side lines of the ladders, and its movements in operation are simple and positive.

It is of great importance to have the tillerman's seat located where he can have a view of the street unobstructed by any portion of the truck above him, and also to make the seat a fixed part of the truck and not a loose or detachable portion liable to be mislaid or lost when the truck is in use.

Having thus described my invention, what I claim, and desire to secure by Letters Patent of the United States, is—

1. The combination with a hook and ladder truck of an angular support resting upon a ladder arch and rising between the rounds and sides of the ladders, a tiller-man's seat hinged upon said support, a coiled spring to throw said seat up upon its hinge, and a diagonal brace rising from said support to hold the back of the seat, substantially as described.

2. The combination with a hook and ladder truck of an angular support resting upon a ladder arch and rising between the rounds and sides of the ladders, a tiller-man's seat hinged upon said support, a coiled spring to throw said seat up upon its hinge, and a diagonal brace rising from said support to hold the back of the seat, and a spring catch to lock said seat to said support, substantially as described.

GEORGE DOUGHERTY.

Witnesses:
WALLACE DUNN,
BENJAMIN R. WELLS.